US007876775B2

(12) United States Patent
Jones et al.

(10) Patent No.: US 7,876,775 B2
(45) Date of Patent: Jan. 25, 2011

(54) CONNECTION MANAGEMENT FOR DATA NETWORKS

(75) Inventors: Kenneth Roger Jones, Cool, CA (US); Brian A. Gonsalves, Antioch, CA (US); Marc Andrew Sullivan, Austin, TX (US); Philip Ted Kortum, Austin, TX (US); Jeffrey Multach, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1508 days.

(21) Appl. No.: 10/777,773

(22) Filed: Feb. 12, 2004

(65) Prior Publication Data

US 2005/0180463 A1   Aug. 18, 2005

(51) Int. Cl.
*H04L 12/66* (2006.01)

(52) U.S. Cl. .................. 370/463; 370/352; 370/389; 370/395.2; 370/395.52; 370/401; 370/493; 375/222; 375/350; 379/93.07; 379/93.14; 379/93.15; 379/93.28; 379/93.36; 379/100.12; 379/106.08; 379/323; 709/220; 709/222; 713/300

(58) Field of Classification Search ............. 370/395.2, 370/395.52, 401, 463, 352, 389, 493; 375/350, 375/222; 709/222, 220; 379/93.07, 93.14, 379/93.15, 93.28, 93.36, 100.12, 106.08, 379/323; 713/300
See application file for complete search history.

(56) References Cited

U.S. PATENT DOCUMENTS

| 5,751,338 | A | 5/1998 | Ludwig, Jr. |
|---|---|---|---|
| 5,974,139 | A | 10/1999 | McNamara et al. |
| 5,987,061 | A | 11/1999 | Chen |
| 6,044,107 | A | 3/2000 | Gatherer et al. |
| 6,055,268 | A | 4/2000 | Timm et al. |
| 6,081,291 | A | 6/2000 | Ludwig, Jr. |
| 6,240,464 | B1 | 5/2001 | Fijolek et al. |
| 6,282,660 | B1 * | 8/2001 | Anne et al. ............... 713/300 |
| 6,292,559 | B1 | 9/2001 | Gaikwad et al. |
| 6,317,495 | B1 | 11/2001 | Gaikwad et al. |
| 6,424,657 | B1 | 7/2002 | Voit et al. |
| 6,466,088 | B1 | 10/2002 | Rezvani et al. |
| 6,467,092 | B1 | 10/2002 | Geile et al. |

(Continued)

OTHER PUBLICATIONS

International Telecommunication Union, "Series G:Transmission Systems and Media, Digital Systems and Networks. Digital Sections and Digital Line System-Access Networks. Asymmetric Digital Subscriber Line (ADSL) Transceivers- 2(ADSL2)," G.992.3, ITU-T. Jul. 2002, pp. 1-127.

(Continued)

*Primary Examiner*—William Trost, IV
*Assistant Examiner*—Toan D Nguyen
(74) *Attorney, Agent, or Firm*—Toler Law Group, I.P.

(57) ABSTRACT

In a particular embodiment, the disclosure is directed to a method of making a digital subscriber line (DSL) connection to a remote network. The method includes detecting the presence of a powered-on network capable device that is connected to a DSL modem; establishing a network connection over a DSL line to the remote network after detecting the presence of the powered on network capable device; terminating the network connection over the DSL line after detecting an absence of network capable devices connected to the DSL modem; and releasing network resources supported by the remote network after the network connection is terminated.

3 Claims, 9 Drawing Sheets

U.S. PATENT DOCUMENTS

| | | | |
|---|---|---|---|
| 6,470,059 B2 * | 10/2002 | Starr | 375/350 |
| 6,477,238 B1 | 11/2002 | Schneider et al. | |
| 6,498,791 B2 | 12/2002 | Pickett et al. | |
| 6,507,606 B2 | 1/2003 | Shenoi et al. | |
| 6,532,277 B2 | 3/2003 | Ulanskas et al. | |
| 6,538,451 B1 | 3/2003 | Galli et al. | |
| 6,549,568 B1 | 4/2003 | Bingel | |
| 6,570,855 B1 | 5/2003 | Kung et al. | |
| 6,597,689 B1 | 7/2003 | Chiu et al. | |
| 6,608,835 B2 | 8/2003 | Geile et al. | |
| 6,614,781 B1 | 9/2003 | Elliott et al. | |
| 6,625,255 B1 | 9/2003 | Green et al. | |
| 6,636,505 B1 * | 10/2003 | Wang et al. | 370/352 |
| 6,640,239 B1 | 10/2003 | Gidwani | |
| 6,643,266 B1 | 11/2003 | Pugaczewski | |
| 6,658,052 B2 | 12/2003 | Krinsky et al. | |
| 6,667,971 B1 | 12/2003 | Modarressi et al. | |
| 6,668,041 B2 | 12/2003 | Kamali et al. | |
| 6,674,725 B2 | 1/2004 | Nabkel et al. | |
| 6,674,749 B1 | 1/2004 | Mattathil | |
| 6,680,940 B1 | 1/2004 | Lewin et al. | |
| 6,697,768 B2 | 2/2004 | Jones et al. | |
| 6,700,927 B1 | 3/2004 | Esliger et al. | |
| 6,711,162 B1 * | 3/2004 | Ortega et al. | 370/389 |
| 6,724,859 B1 | 4/2004 | Galli | |
| 6,728,238 B1 | 4/2004 | Long et al. | |
| 6,731,678 B1 | 5/2004 | White et al. | |
| 6,735,601 B1 | 5/2004 | Subrahmanyam | |
| 6,751,218 B1 | 6/2004 | Hagirahim et al. | |
| 6,751,304 B1 * | 6/2004 | Edmon et al. | 379/93.32 |
| 6,751,315 B1 | 6/2004 | Liu et al. | |
| 6,751,662 B1 | 6/2004 | Natarajan et al. | |
| 6,754,283 B1 | 6/2004 | Li | |
| 6,762,992 B1 | 7/2004 | Lemieux | |
| 6,763,025 B2 | 7/2004 | Leatherbury et al. | |
| 6,765,864 B1 | 7/2004 | Natarajan et al. | |
| 6,765,918 B1 | 7/2004 | Dixon et al. | |
| 6,769,000 B1 | 7/2004 | Akhtar et al. | |
| 6,769,024 B1 | 7/2004 | Natarajan et al. | |
| 6,771,673 B1 | 8/2004 | Baum et al. | |
| 6,775,232 B1 | 8/2004 | Ah Sue et al. | |
| 6,775,267 B1 | 8/2004 | Kung et al. | |
| 6,775,268 B1 | 8/2004 | Wang et al. | |
| 6,775,273 B1 | 8/2004 | Kung et al. | |
| 6,778,525 B1 | 8/2004 | Baum et al. | |
| 6,782,082 B2 | 8/2004 | Rahamim | |
| 6,845,406 B2 * | 1/2005 | Hori et al. | 710/10 |
| 6,854,009 B1 * | 2/2005 | Hughes | 709/220 |
| 7,006,559 B1 * | 2/2006 | Mardinian | 375/222 |
| 7,032,012 B2 * | 4/2006 | Roh | 709/220 |
| 7,069,328 B1 * | 6/2006 | Bell | 709/227 |
| 7,127,049 B2 * | 10/2006 | Godse et al. | 379/93.28 |
| 7,647,390 B2 * | 1/2010 | Ji et al. | 709/222 |
| 2003/0055987 A1 | 3/2003 | Ji et al. | |
| 2003/0061321 A1 * | 3/2003 | Roh | 709/222 |
| 2003/0131107 A1 | 7/2003 | Godse et al. | |
| 2003/0174714 A1 * | 9/2003 | Manik et al. | 370/396 |
| 2004/0057509 A1 * | 3/2004 | Porat et al. | 375/222 |
| 2004/0095921 A1 | 5/2004 | Kerpez | |
| 2004/0109457 A1 * | 6/2004 | Johnson et al. | 370/401 |
| 2006/0020525 A1 * | 1/2006 | Borelli et al. | 705/34 |
| 2006/0168238 A1 * | 7/2006 | Massam et al. | 709/227 |

OTHER PUBLICATIONS

International Search Report and Written Opinion of the International Searching Authority for International Application No. PCT/US05/02153, Mailed on Mar. 30, 2006.

* cited by examiner

CONNECTION MANAGEMENT FOR DATA NETWORKS

FIELD OF THE DISCLOSURE

The present disclosure relates generally to connection management for data networks.

BACKGROUND OF THE DISCLOSURE

Typically dynamic connections for digital subscriber line (DSL) services are created "on demand". When a network request is received by a DSL modem, the DSL modem establishes a connection to the network. After a period of network inactivity the network connection is terminated. This termination procedure is used to free up network resources to service other customers.

The problem with this approach is that during the time taken to build a connection, the end user is unable to use network applications. This can cause a noticeable delay to the end user that is viewed negatively and interferes with normal usage of the DSL connection. In addition some applications will appear to fail because the network connection cannot be created in the time window that the client application expects.

A second alternative, which is implemented in many consumer gateways is to constantly maintain a connection. From an end-user perspective, this solution works very well. From the perspective of the network provider, this is undesirable because network resources are being consumed even when the end user does not require network connectivity.

Currently telecommunication providers and other internet service providers (ISPs) are either deploying or planning to deploy digital subscriber line (DSL) routers and point to point over Ethernet (PPPoE) modems to replace currently deployed ADSL modems in the consumer and small business markets. Surveys have determined that a majority of home users disconnect their DSL PPPoE connections while they are not in use. This is primarily done for security reasons. This is accomplished by using a graphical user interface on Ethernet PPPoE client software to open or close the PPPoE session.

However, DSL routers and PPPoE modems don't provide an easy method to disconnect the PPPoE DSL connection. The current method is to connect to the router using a web browser and go through a series of browser windows to select the disconnect/connect tabs. Many users have more than one PC or other device connected to their routers, so if they simply turn the router off, they will also turn off their LAN connections. These users typically want to continue using their LAN to allow local PC's to communicate and to print/share files, while their wide area network (WAN) is disconnected for security reasons. Unplugging the WAN cable at the router is not a good solution because frequent plugging/unplugging will damage the jack.

Accordingly, there is a need for an improved system and method of selectively connecting and disconnecting DSL network communication paths.

DETAILED DESCRIPTION OF THE DRAWINGS

In a particular embodiment, the disclosure is directed to a method of making a digital subscriber line (DSL) connection to a remote network. The method includes detecting the presence of a powered-on network capable device that is connected to a DSL modem; establishing a network connection over a DSL line to the remote network after detecting the presence of the powered on network capable device; terminating the network connection over the DSL line after detecting an absence of network capable devices connected to the DSL modem; and releasing network resources supported by the remote network after the network connection is terminated.

In another embodiment, a digital subscriber line communication system is disclosed. The system includes a digital subscriber line (DSL) router coupled to a digital subscriber line connected to a remote digital subscriber line access multiplexer, and a digital subscriber line between the digital subscriber line router and the digital subscriber line access multiplexer. A network connection is made over the digital subscriber line after the detection logic detects the presence of the powered-on network capable device. The digital subscriber line router includes detection logic to detect the presence of a powered-on network capable device that is connected to the DSL router.

Figure 1:
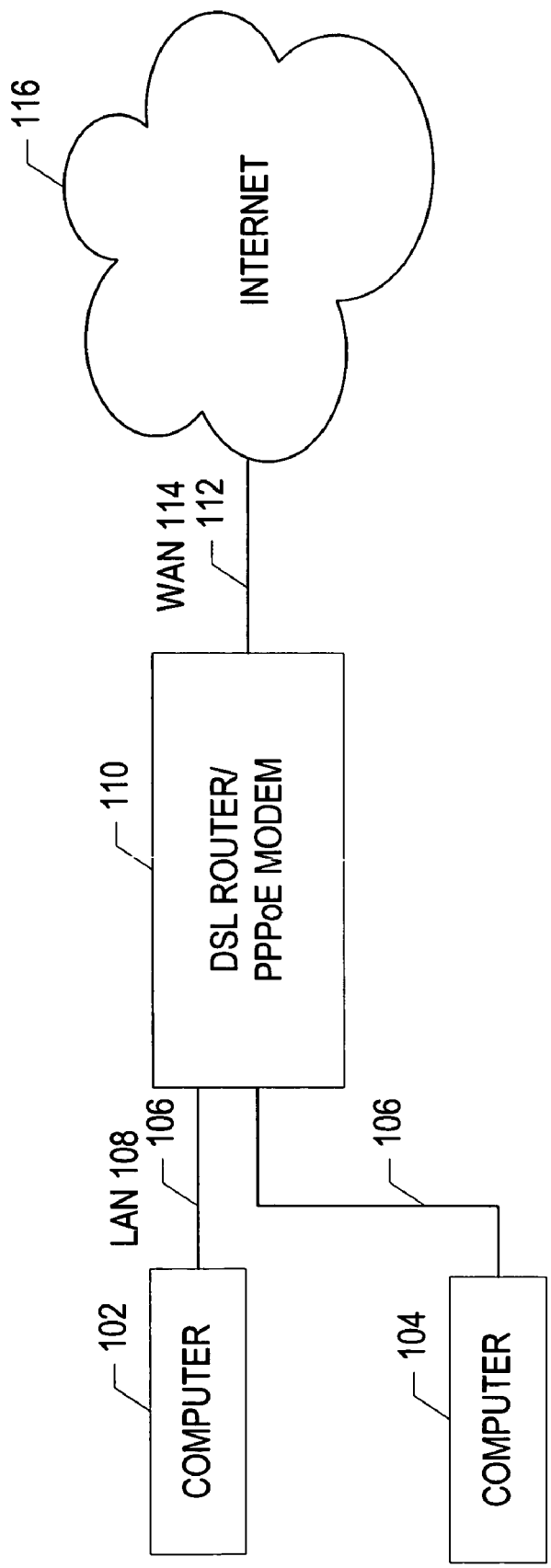
FIG. 1 is a block diagram of an illustrative system having a DSL router or PPPoE modem.

Referring to FIG. 1, an illustrative system is shown. The system includes a DSL router or PPPoE modem 110 coupled to the internet 116 via a DSL line 112. The DSL router/PPPoE modem 110 supports multiple computers such as a first computer 102 and a second computer 104. Computers 102, 104 are connected via local area network 108 and are connected to the DSL router 110 via a local area network connection such as Ethernet connection 106 as illustrated. A wide area network (WAN) 114 is between the DSL router 110 and internet network 116.

Figure 2:
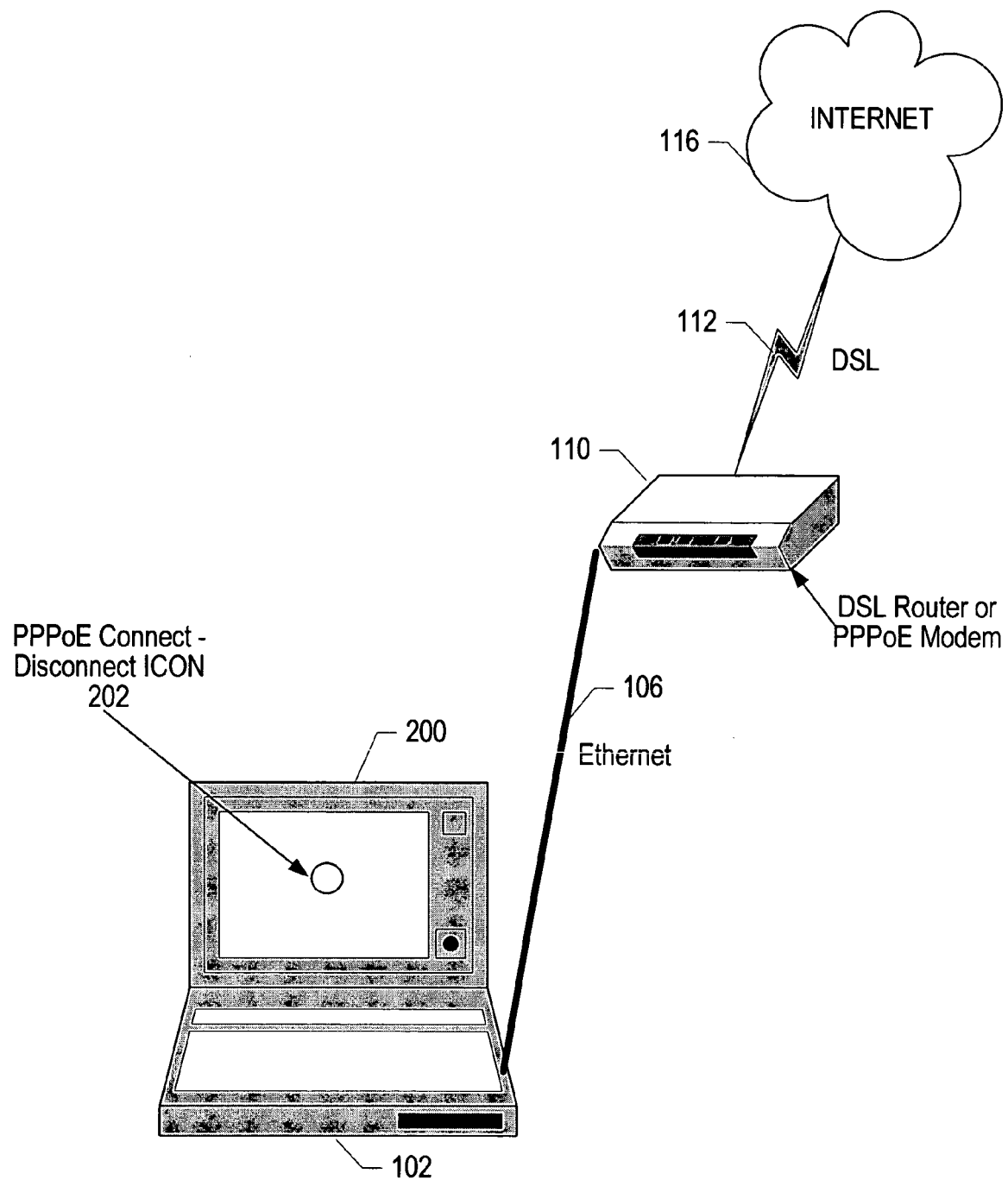
FIG. 2 is a general diagram that illustrates an end-user computer connected to a DSL router or PPPoE modem.

Referring to FIG. 2, an illustrative embodiment is shown. The computer 102 is connected via the Ethernet connection 106 to a DSL router or PPPoE modem which in turn is connected over DSL line 112 to the internet 116. The first illustrative computer 102 includes a display 200 which has a graphic icon 202 on the display. The graphic icon 202 illustrates a connection or disconnection status of the PPPoE connection from the computer 102 through the DSL router 110 into the internet 116.

Figure 3:
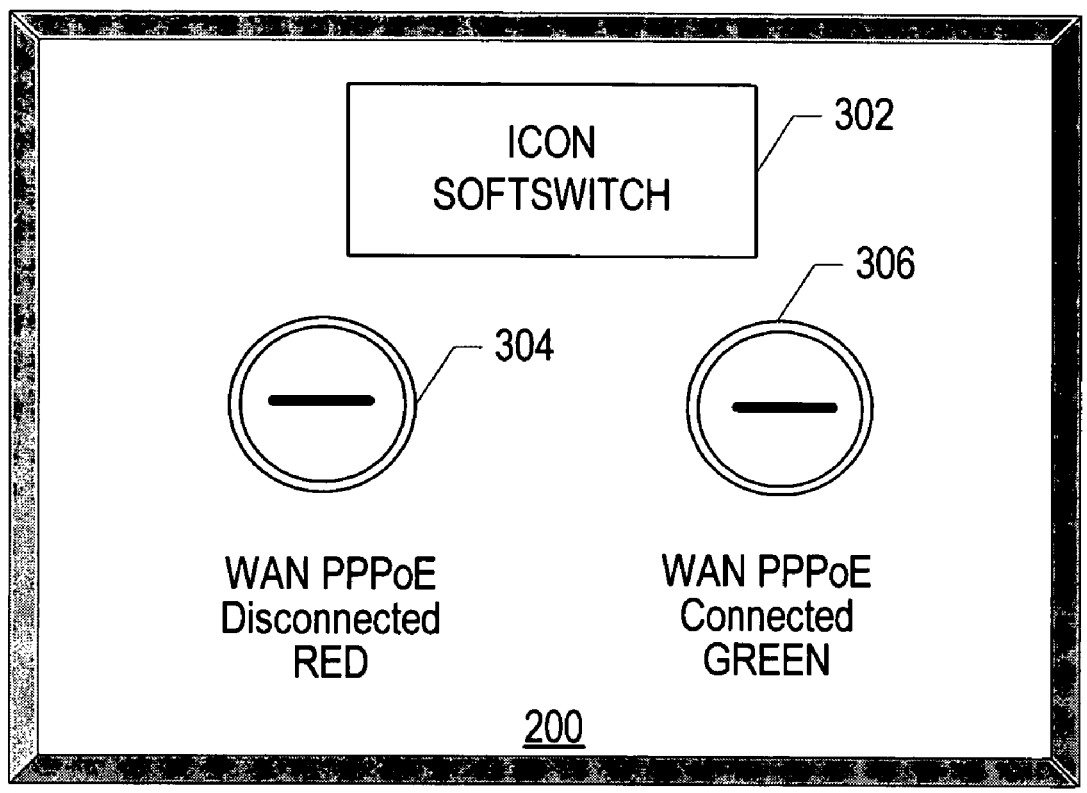
FIG. 3 is a general diagram that illustrates the display of the computer shown in FIG. 2.

Referring to FIG. 3, an embodiment of the display 200 is shown. Display 200 includes a soft switch icon 302 and allows a user to select connection or disconnection of the PPPoE session. In the event that a PPPoE session has been activated then a connection indication is shown by the PPPoE icon 202, such as illustrated by the WAN PPPoE connection green indicator identifying a connection via graphic icon 306. After the PPPoE session has been disconnected, then a disconnected status is shown at the icon, such as a WAN PPPoE red indicator identifying a disconnect status 304. The display 200 and the associated icon 202 allows a user to select connection or disconnection of the PPPoE session it allows users to monitor the connection status.

Figure 4:
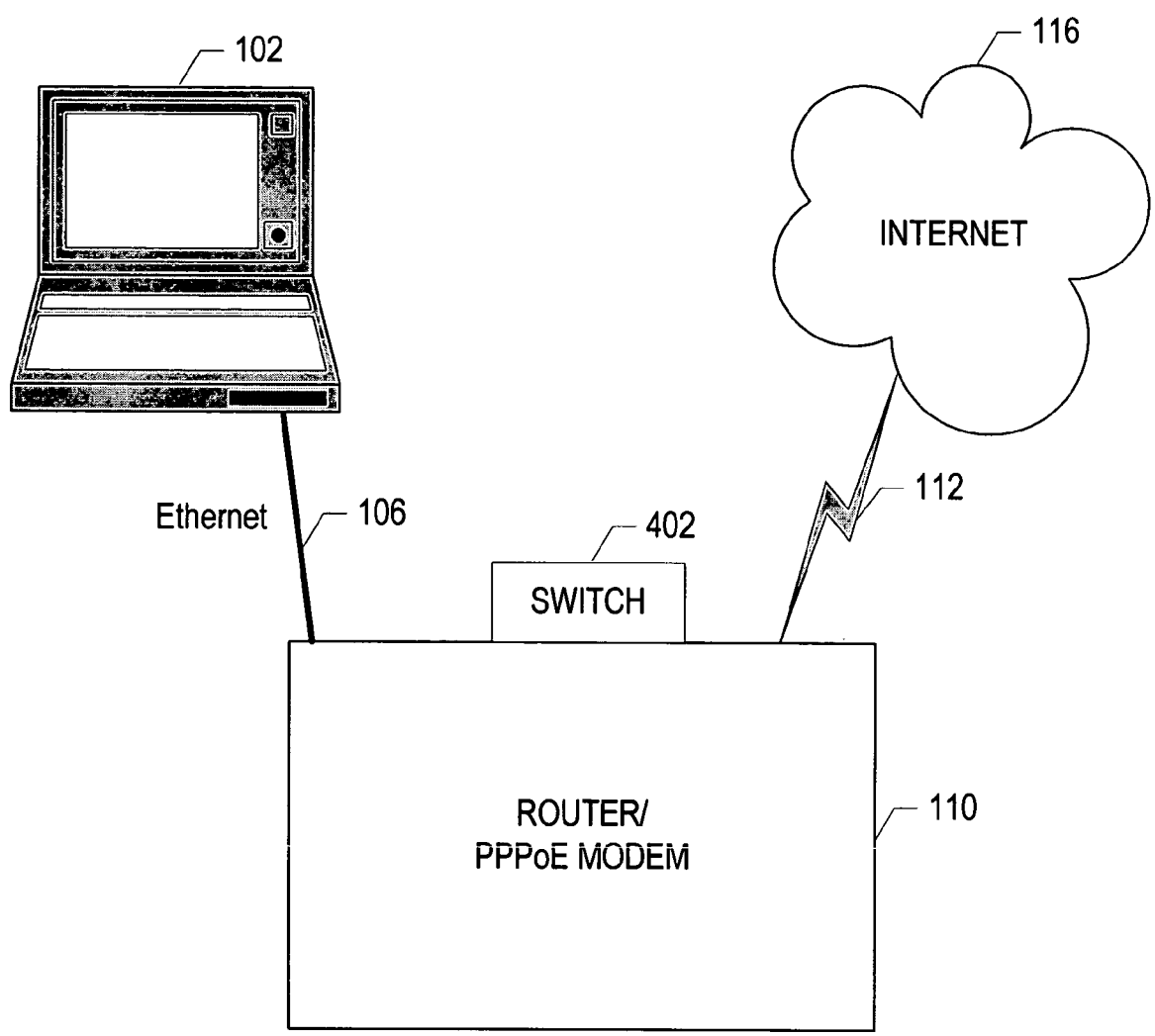
FIG. 4 is a general diagram that illustrates DSL equipment with a PPPoE connect/disconnect switch.

Referring to FIG. 4, another embodiment of a system that provides selective connection of a PPPoE session is shown. The system includes a first computer 102 connected an Ethernet connection to a DSL router or PPPoE modem 110. The DSL router or PPPoE modem 110 is connected over a DSL line 112 to the internet 116. In this embodiment, the DSL router includes a PPPoE connection/disconnection switch 402. The switch 402 is a physical hardware switch that allows a user or technician to selectively connect or disconnect a PPPoE session.

Figure 5:
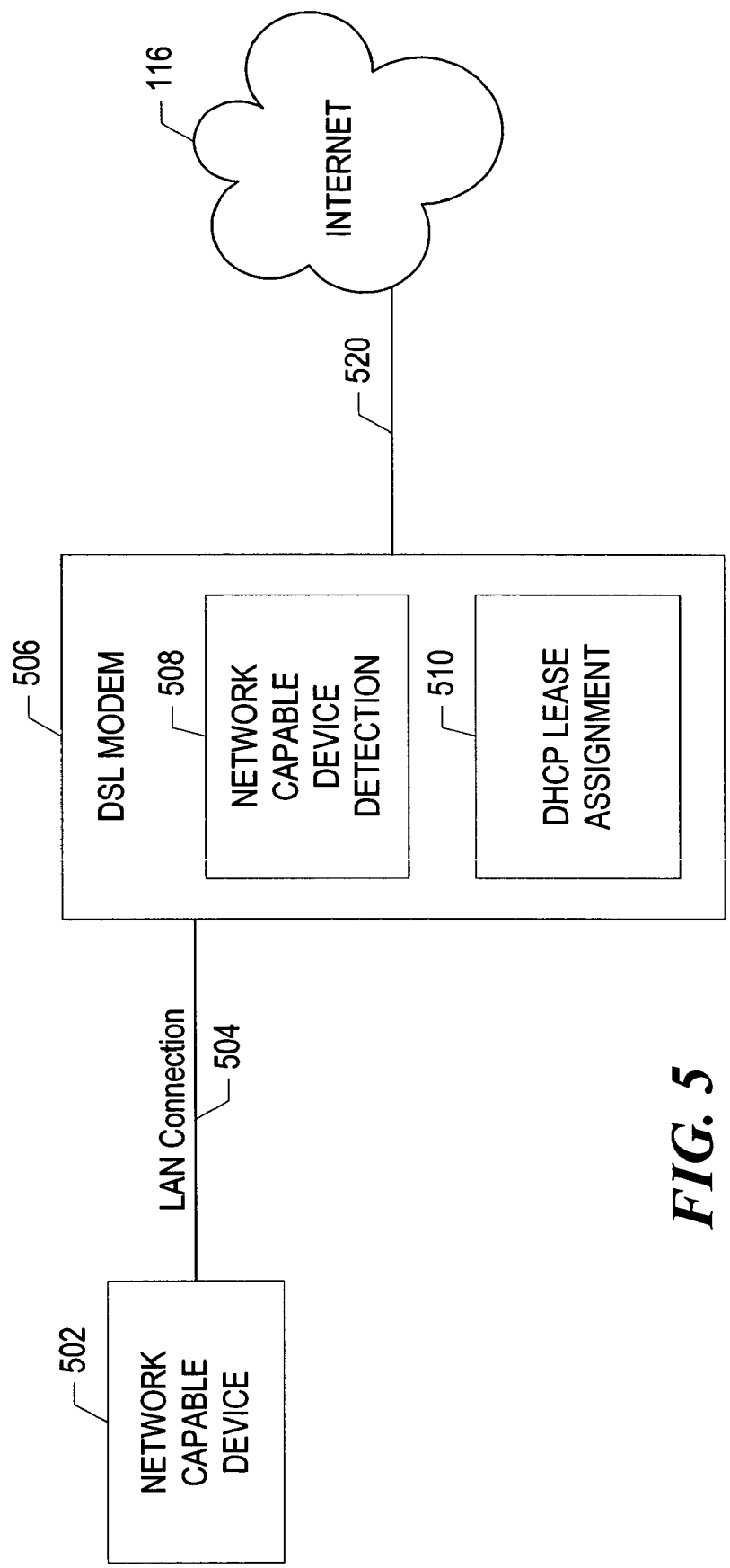
FIG. 5 is a block diagram that illustrates connection and detection of a network capable device.

Referring to FIG. 5, another embodiment of a system having a DSL modem and a local area network (LAN) and a wide area network (WAN) connection is shown. The system includes DSL modem 506, which is coupled over a LAN connection 504 to a network capable device 502, such as a computer. The DSL modem 506 is connected over DSL line 520 to the internet. DSL modem 506 includes a network capable device detection module 508 and a DHCP lease assignment module 510.

Figure 6:
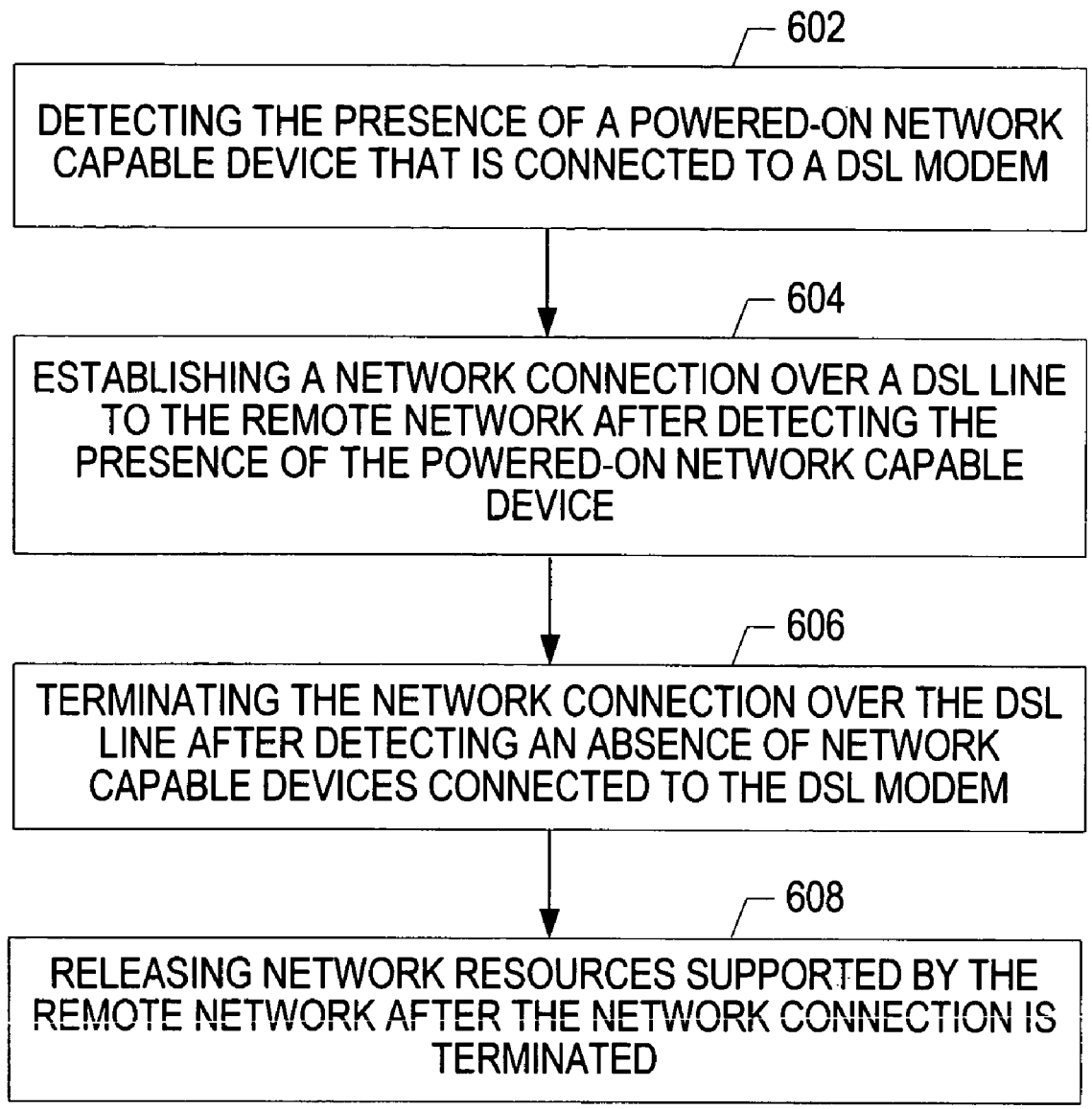
FIGS. 6-9 are flow charts that illustrate methods of using a DSL network.

Referring to FIG. 6, a method of operating the system illustrated in FIG. 5 is shown. The presence of a powered-on network capable device connected to a DSL modem is detected, at 602. A network connection is established over the DSL line to the network after detecting the presence of the powered-on network capable device, at 604. The network connection over the DSL line is terminated after detecting an absence of any network capable device being connected to the DSL modem, at 606. Network resources are released that support the network after the network connection has been terminated, as shown at step 608.

Figure 7:
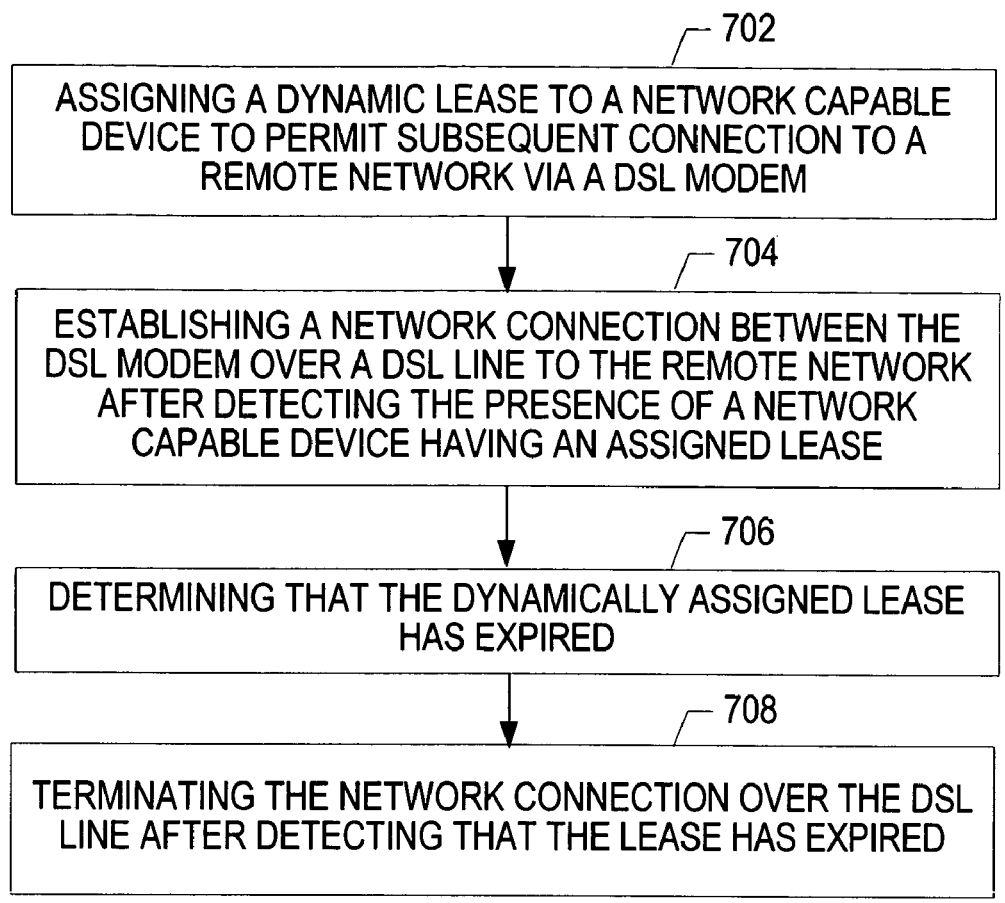

Referring to FIG. 7, another method of operation is shown with respect to the system of FIG. 5. A dynamic lease is assigned to a network capable device to permit subsequent connection to a remote network via a DSL modem, at step 702. A network connection is then established between the DSL modem over a DSL line and to the remote network after detecting the presence of a network capable device having an assigned lease, at 704. Sometime during the transmission session, it is determined that the lease has expired, at 706. After determining that the lease has expired, the network connection over the DSL line is terminated, as shown at 708.

Figure 8:
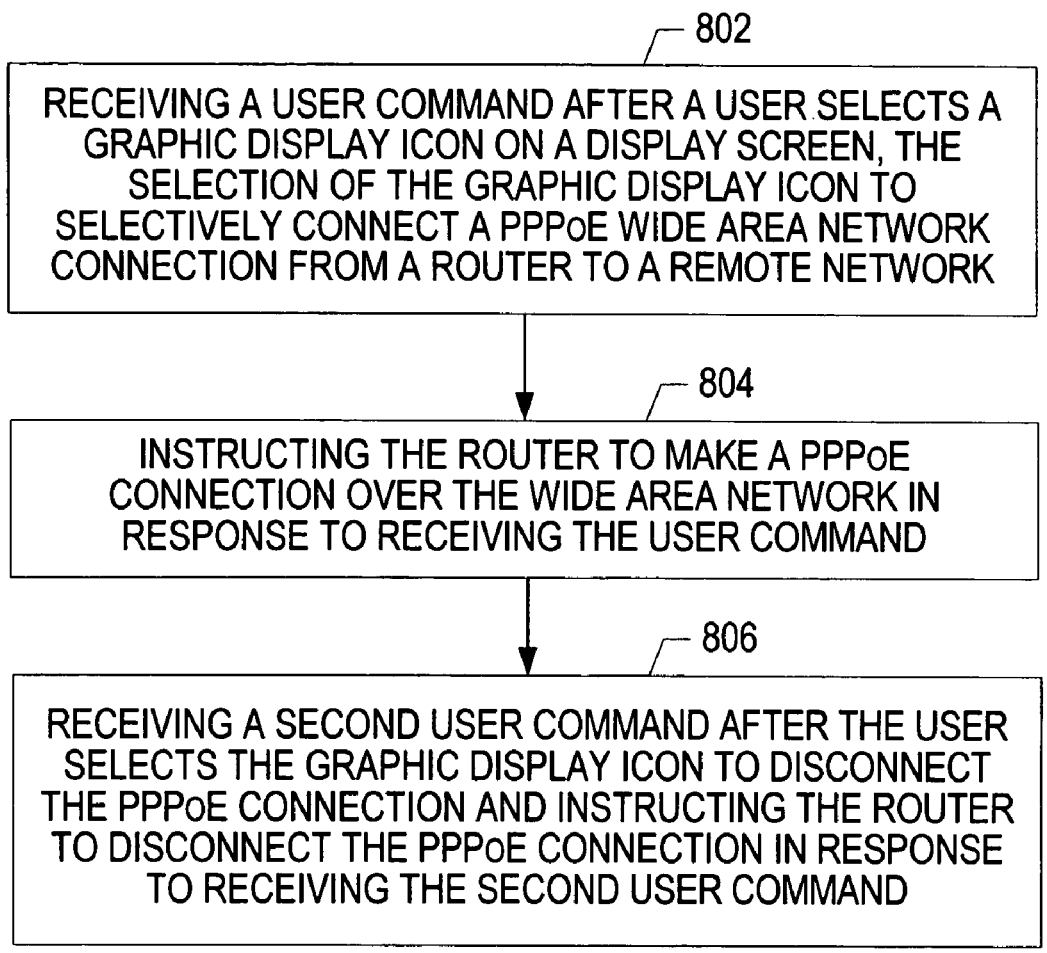

Referring to FIG. 8, another embodiment of a method of operating a system having a wide area network connection is shown. A user command is received after a user selects a graphic display icon on a display screen, at 802. The graphic display icon is used to selectively connect a PPPoE wide area network connection from a router to a remote network. The router is instructed to make a PPPoE connection over the wide area network in response to receiving the user command, at 804. Optionally, a second user command may be received after the user selects the graphic icon to disconnect the PPPoE connection and to instruct the router to disconnect the connection, as shown at 806.

Figure 9:
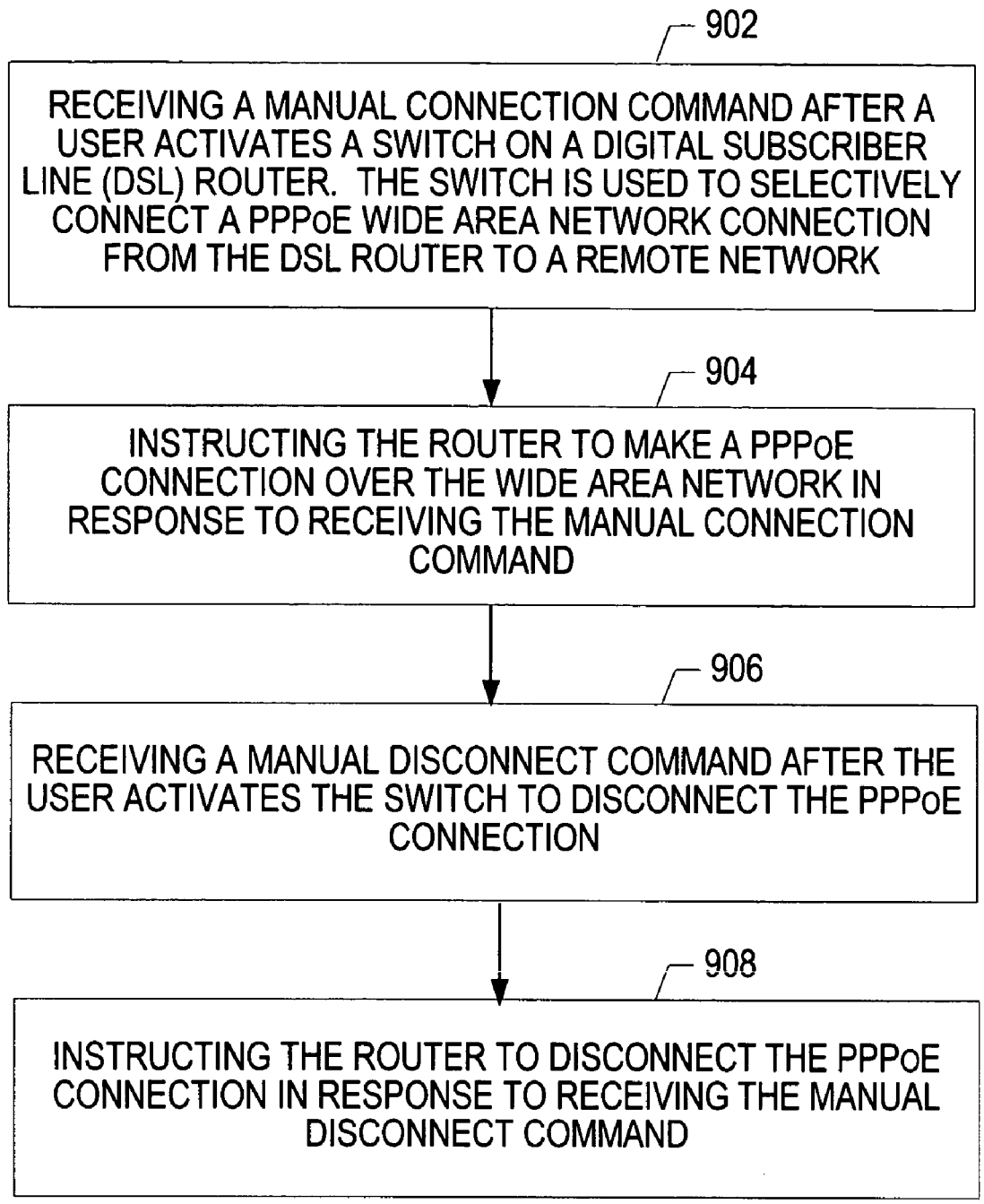

Referring to FIG. 9, another method of operating a data communication system is shown. A manual connection command is received after a user activates a manual switch on a DSL router, at 902. The manual switch is used to selectively connect a PPPoE wide area network connection from the DSL router to a remote network. The router is instructed to make a PPPoE connection over the wide area network in response to receiving the manual connection command, as shown at 904. The manual switch may also receive a manual disconnect command after the user activates the switch in order to disconnect the PPPoE connection, at step 906. The router is instructed to disconnect the PPPoE connection in response to receiving the manual disconnect command, at 908.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of making a digital subscriber line (DSL) connection to a remote network, the method comprising:

detecting, at a DSL modem coupled to a local network, a presence of a powered-on network capable device that is connected to the DSL modem via the local network, the local network including at least one network capable device that contains a graphical activation display icon to illustrate a connection status of the powered-on network capable device with respect to the DSL modem, wherein in response to receiving a user command, the graphical activation display icon selectively connects the powered-on network capable device to the DSL modem via a point-to-point protocol over Ethernet (PPPoE) connection;

establishing a network connection over a DSL line to a remote network after detecting the presence of the powered-on network capable device that is connected to the DSL modem on the local network;

disconnecting the network connection over the DSL line to the remote network in response to detecting an absence of one or more powered-on network capable devices of the at least one network capable device connected to the DSL modem on the local network;

disconnecting the network connection over the DSL line to the remote network in response to receiving a second user command to disconnect the PPPoE connection;

releasing network resources supported by the remote network after the network connection is disconnected;

assigning a dynamic lease to the powered-on network capable device;

determining when the dynamic lease expires; and disconnecting the network connection over the DSL line after detecting that the dynamic lease has expired.

2. A digital subscriber line communication system comprising:

a digital subscriber line (DSL) router including connection detection logic to detect a presence of a powered-on network capable device that is connected to the DSL router via a local network, wherein the local network includes at least one network capable device that contains a graphical activation display icon to illustrate a connection status of the powered-on network capable device with respect to the DSL router and, in response to receiving a user command, the graphical activation display icon selectively connects the powered-on network capable device to the DSL router via a point-to-point protocol over Ethernet (PPPoE) connection and, in response to receiving a second user command to disconnect, the graphical activation display icon disconnects the PPPoE connection; and a DSL line between the DSL router and a remote network, wherein a network connection is made over the digital subscriber line to the remote network after the connection detection logic detects the presence of the powered-on network capable device that is connected to the DSL router via the local network, wherein a dynamic lease is assigned to the powered-on network capable device and the network connection over the DSL line is disconnected in response to detecting that the dynamic lease has expired.

3. A digital subscriber line (DSL) communication system comprising:

a DSL router coupled to a local network, the DSL router including:

lease assignment logic to dynamically assign a lease to a network capable device to permit a subsequent connection to a remote network and to disconnect the subsequent connection to the remote network in response to determining that the dynamically assigned lease has expired;

connection detection logic to detect a presence of a powered-on network capable device that is connected to the DSL router via the local network, wherein the local network includes at least one network capable device that contains a graphical activation display icon to illustrate a connection status of the at least one network capable device with respect to the remote network and, in response to receiving a user command, the graphical activation display icon selectively connects the at least one network capable device to the remote network via a point-to-point protocol over Ethernet (PPPoE) connection and, in response to receiving a second user command to disconnect, the graphical activation display icon disconnects the PPPoE connection; and a DSL line between the DSL router and the remote network, wherein a network connection is made over the digital subscriber line after the lease assignment logic has assigned the lease to the network capable device.

* * * * *